United States Patent
Sim et al.

(10) Patent No.: US 9,491,811 B2
(45) Date of Patent: Nov. 8, 2016

(54) COOKING APPLIANCE EMPLOYING MICROWAVES

(75) Inventors: Sung Hun Sim, Seoul (KR); Yang Kyeong Kim, Seoul (KR); Wan Soo Kim, Seoul (KR); Jin Yul Hu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1155 days.

(21) Appl. No.: 13/266,547

(22) PCT Filed: Jun. 18, 2010

(86) PCT No.: PCT/KR2010/003985
§ 371 (c)(1),
(2), (4) Date: Jan. 9, 2012

(87) PCT Pub. No.: WO2011/010799
PCT Pub. Date: Jan. 27, 2011

(65) Prior Publication Data
US 2012/0097669 A1    Apr. 26, 2012

(30) Foreign Application Priority Data

Jul. 21, 2009 (KR) .................. 10-2009-0066490
Jul. 21, 2009 (KR) .................. 10-2009-0066491

(51) Int. Cl.
*H05B 6/64* (2006.01)
*H05B 6/70* (2006.01)
*H05B 6/68* (2006.01)

(52) U.S. Cl.
CPC ............ *H05B 6/6447* (2013.01); *H05B 6/688* (2013.01); *H05B 6/705* (2013.01); *H05B 2206/044* (2013.01); *Y02B 40/146* (2013.01)

(58) Field of Classification Search
CPC .......... H05B 6/04; H05B 6/06; H05B 6/686; H05B 6/66; H05B 6/687; H05B 6/702; H05B 6/705; H05B 6/68; H05B 6/64; H05B 2206/044; H05B 6/688; Y02B 41/146
USPC ........ 219/620, 660, 695–697, 702, 704, 705, 219/709–718, 725, 745–750, 756, 758, 760, 219/761, 762
See application file for complete search history.

(56) References Cited

U.S. PATENT DOCUMENTS 2,143,891 A * 1/1939 Lindenblad .......... H03B 5/1835
                                                                331/102
2,593,067 A * 4/1952 Spencer ............... H05B 6/6402
                                                                219/697

(Continued)

FOREIGN PATENT DOCUMENTS

JP      2000-357583           12/2000
JP      2000-357583 A         12/2000

(Continued)

OTHER PUBLICATIONS

International Search Report issued in PCT/KR2010/003985 dated Feb. 10, 2011.

(Continued)

*Primary Examiner* — Eric Stapleton
(74) *Attorney, Agent, or Firm* — Ked & Associates, LLP

(57) ABSTRACT

A cooking appliance employing microwaves is provided. The cooking appliance employing microwaves includes a first microwave generating unit for generating and outputting a plurality of microwaves so as to heat an object in a cavity; and a second microwave generating unit for generating and outputting microwaves differing from those of the first microwave generating unit, so as to heat the object in the cavity. In this way, operating efficiency can be improved.

10 Claims, 5 Drawing Sheets

(56) References Cited

U.S. PATENT DOCUMENTS

| | | | | |
|---|---|---|---|---|
| 2,748,277 A * | 5/1956 | Haagensen | H01J 25/587 | 219/761 |
| 3,104,304 A * | 9/1963 | Sawada | H05B 6/06 | 219/771 |
| 3,248,647 A * | 4/1966 | Eichaker | G01R 27/32 | 324/629 |
| 3,376,524 A * | 4/1968 | Wang | H01J 23/20 | 333/227 |
| 3,467,804 A * | 9/1969 | Smith | F24C 7/02 | 219/706 |
| 3,611,135 A * | 10/1971 | Margerum | G01S 3/48 | 324/84 |
| 3,714,550 A * | 1/1973 | Hyde | G01R 33/60 | 324/316 |
| 3,875,361 A * | 4/1975 | Fukui | G05D 23/1909 | 219/710 |
| 4,042,891 A * | 8/1977 | Levine | H03L 7/02 | 331/1 R |
| 4,079,221 A * | 3/1978 | McGillem | H01P 1/182 | 219/747 |
| 4,196,332 A * | 4/1980 | MacKay | H05B 6/68 | 219/709 |
| 4,210,795 A * | 7/1980 | Lentz | H05B 6/6432 | 219/703 |
| 4,230,731 A * | 10/1980 | Tyler | G01K 1/024 | 219/713 |
| 4,301,347 A * | 11/1981 | Quine | H05B 6/74 | 219/747 |
| 4,323,745 A * | 4/1982 | Berggren | B29C 35/08 | 219/697 |
| 4,336,433 A * | 6/1982 | Yokozeki | G05D 22/02 | 219/707 |
| 4,336,434 A * | 6/1982 | Miller | H05B 6/704 | 219/747 |
| 4,340,796 A * | 7/1982 | Yamaguchi | G01K 1/024 | 219/516 |
| 4,376,131 A * | 3/1983 | Mori | G01N 33/02 | 219/707 |
| 4,377,733 A * | 3/1983 | Yamaguchi | G01K 1/024 | 219/516 |
| 4,379,964 A * | 4/1983 | Kanazawa | A23L 1/0128 | 219/413 |
| 4,381,439 A * | 4/1983 | Miyazawa | A47J 37/00 | 219/713 |
| 4,415,789 A * | 11/1983 | Nobue | H05B 6/6435 | 219/709 |
| 4,446,349 A * | 5/1984 | Smith | H05B 6/74 | 219/747 |
| 4,464,554 A * | 8/1984 | Bakanowski | H05B 6/72 | 219/746 |
| 4,477,707 A * | 10/1984 | Kim | B29C 35/10 | 156/272.4 |
| 4,518,839 A * | 5/1985 | Taguchi | H05B 6/6411 | 219/706 |
| 4,520,250 A * | 5/1985 | Ishihara | H05B 6/6411 | 219/703 |
| 4,587,605 A * | 5/1986 | Kouyama | H02M 7/53873 | 318/811 |
| 4,621,179 A * | 11/1986 | Kusunoki | H05B 6/686 | 219/697 |
| 4,714,812 A * | 12/1987 | Haagensen | F26B 3/343 | 219/696 |
| 4,771,153 A * | 9/1988 | Fukushima | H05B 6/645 | 219/696 |
| 4,791,263 A * | 12/1988 | Groeschel, Jr. | H05B 6/6458 | 219/707 |
| 4,825,028 A * | 4/1989 | Smith | H05B 6/666 | 219/716 |
| 4,843,202 A * | 6/1989 | Smith | H02M 5/458 | 219/716 |
| 4,866,344 A * | 9/1989 | Ross | H01J 25/38 | 315/3.5 |
| 4,870,236 A * | 9/1989 | Berggren | H05B 6/782 | 219/691 |
| 4,870,238 A * | 9/1989 | Hodgetts | H05B 6/687 | 219/506 |
| 4,873,409 A * | 10/1989 | Spruytenburg | H05B 6/687 | 219/506 |
| 4,937,413 A * | 6/1990 | Spruytenburg | H05B 6/68 | 219/706 |
| 4,939,331 A * | 7/1990 | Berggren | H05B 6/666 | 219/716 |
| 5,008,506 A * | 4/1991 | Asmussen | H05B 6/705 | 219/696 |
| 5,179,264 A * | 1/1993 | Cuomo | H01J 37/32201 | 219/121.36 |
| 5,436,433 A * | 7/1995 | Kim | H05B 6/6458 | 219/703 |
| 5,445,009 A * | 8/1995 | Yang | H05B 6/6458 | 219/707 |
| 5,464,967 A * | 11/1995 | Gong | H05B 6/6458 | 219/703 |
| 5,521,360 A * | 5/1996 | Johnson | H05B 6/686 | 219/697 |
| 5,632,921 A * | 5/1997 | Risman | H05B 6/6402 | 219/697 |
| 5,657,215 A * | 8/1997 | Faulk | H02M 3/33507 | 363/41 |
| 5,744,785 A * | 4/1998 | Lee | H05B 6/6458 | 219/705 |
| 5,847,261 A * | 12/1998 | Lee | H05B 6/6458 | 219/707 |
| 5,851,319 A * | 12/1998 | Atwater | H01L 21/32115 | 148/525 |
| 5,892,198 A * | 4/1999 | Barnes | H01J 37/32082 | 219/121.43 |
| 5,912,552 A * | 6/1999 | Tateishi | H02M 3/1588 | 323/224 |
| 5,932,131 A * | 8/1999 | Joo | H05B 6/708 | 219/746 |
| 5,939,871 A * | 8/1999 | Tanaka | H02M 3/1563 | 323/285 |
| 5,961,871 A * | 10/1999 | Bible | H05B 6/686 | 219/709 |
| 6,066,841 A * | 5/2000 | Kim | H05B 6/707 | 219/746 |
| 6,680,467 B1 * | 1/2004 | Whipple, Jr. | H05B 6/6402 | 219/697 |
| 6,774,347 B2 * | 8/2004 | Shon | H05B 6/6458 | 219/707 |
| 7,554,054 B2 * | 6/2009 | Takada | H01J 37/32192 | 219/121.4 |
| 8,212,428 B2 * | 7/2012 | Choi | H01J 37/32192 | 307/106 |
| 2004/0004807 A1 * | 1/2004 | Kim | H05B 6/64 | 361/600 |
| 2004/0206755 A1 * | 10/2004 | Hadinger | H05B 6/80 | 219/761 |
| 2006/0081624 A1 * | 4/2006 | Takada | H01J 37/32192 | 219/716 |
| 2010/0176121 A1 * | 7/2010 | Nobue | H05B 6/686 | 219/716 |
| 2010/0176123 A1 * | 7/2010 | Mihara | H05B 6/705 | 219/746 |
| 2010/0224623 A1 * | 9/2010 | Yasui | H05B 6/686 | 219/702 |

FOREIGN PATENT DOCUMENTS

| | | |
|---|---|---|
| JP | 2007-317458 | 12/2007 |
| JP | 2008-269793 | 11/2008 |
| JP | 2008-269793 A | 11/2008 |
| KR | 10-0168128 B1 | 1/1999 |
| WO | WO 2009/011111 | 1/2009 |
| WO | WO 2009/050893 | 4/2009 |

OTHER PUBLICATIONS

Korean Office Action issued in Application No. 10-2009-0066490 dated Aug. 26, 2015.

* cited by examiner

COOKING APPLIANCE EMPLOYING MICROWAVES

CROSS-REFERENCE TO RELATED PATENT APPLICATIONS

This application is a U.S. National Stage Application under 35 U.S.C. §371 of PCT Application No. PCT/KR2010/003985, filed Jun. 18, 2010, which claims priority to Korean Patent Application Nos. 10-2009-0066490, filed Jul. 21, 2009, and 10-2009-0066491, filed Jul. 21, 2009.

TECHNICAL FIELD

The present invention relates to a cooking appliance employing microwaves, and more particularly, to a cooking appliance employing microwaves capable of improving operation efficiency.

BACKGROUND ART

In general, in a cooking appliance employing microwaves, after closing received foods, when pressing an operation button, a voltage is applied to a high voltage generator. In this case, a commercial voltage applied to the high voltage generator is boosted and the power is applied to a magnetron to generate microwaves, and the microwaves generated by the magnetron are transmitted to a cavity through a waveguide.

At this point, the cooking appliance employing microwaves heats food through frictional heat generated by vibrating the molecules composed of the food by two billions and five million times per second after irradiating the food with microwaves generated from the magnetron.

The cooking appliance employing microwaves is widespread in a home due to various advantages such as ease of the temperature control, cooking time savings, ease of operation and the like.

However, when cooking food employing the microwaves, there are problems that the food is not evenly heated due to a surface deviation of the food and the difference in temperature is generated in the food in part. In addition, there is a problem that a temperature deviation varies when cooking according to the type of food received in the cooking appliance

DISCLOSURE

Technical Problem

The present invention has been made in an effort to solve the problems occurring in the prior art, and it is an object of the present invention to provide a cooking appliance employing microwaves capable of improving operating efficiency.

Technical Solution

In order to solve the above-mentioned problems, the cooking appliance employing microwaves according to the present invention includes: a first microwave generating unit for generating and outputting a plurality of microwaves so as to heat an object in a cavity; and a second microwave generating unit for generating and outputting microwaves differing from those of the first microwave generating unit, so as to heat the object in the cavity.

Advantageous Effects

According to an embodiment of the present invention, a cooking appliance employing microwaves includes a first microwave generating unit for generating and outputting a plurality of microwaves so as to heat an object in a cavity and a second microwave generating unit for generating and outputting microwaves differing from those of the first microwave generating unit, and in this way, operating efficiency can be improved.

Meanwhile, when the second microwave generating unit is a magnetron for generating and outputting a single microwave, when defrosting process of the cooking processes, it is possible to uniformly defrost an object by enhancing the operation of the microwave generating unit.

In addition, when heating process of the cooking processes, it is possible to improve heating efficiency by enhancing the operation of the magnetron.

Meanwhile, the heating efficiency is calculated based on microwaves outputted and reflected from the first microwave generating unit and an output period of the microwave can be varied according to the calculated heating efficiency. In this way, the heating may be uniformly performed.

Meanwhile, when the second microwave generating unit generates and outputs a plurality of microwaves of the frequencies differing from the first microwave generating unit, since it is divided for each of periods, the operating efficiency of each of the each microwave generating units can be improved.

Meanwhile, the heating efficiencies are calculated based on microwaves outputted and reflected from the first and second microwave generating units and an output period of the microwave can be varied according to the calculated heating efficiency. In this way, the heating may be uniformly performed.

BEST MODE

Exemplary embodiments of the present invention will now be described in detail with reference to the accompanying drawings.

In the following description, usage of suffixes such as 'module', 'part' or 'unit' used for referring to elements is given merely to facilitate explanation of the present invention, without having any significant meaning by itself. Thus, the 'module' and 'part' may be mixedly used.

Figure 1:
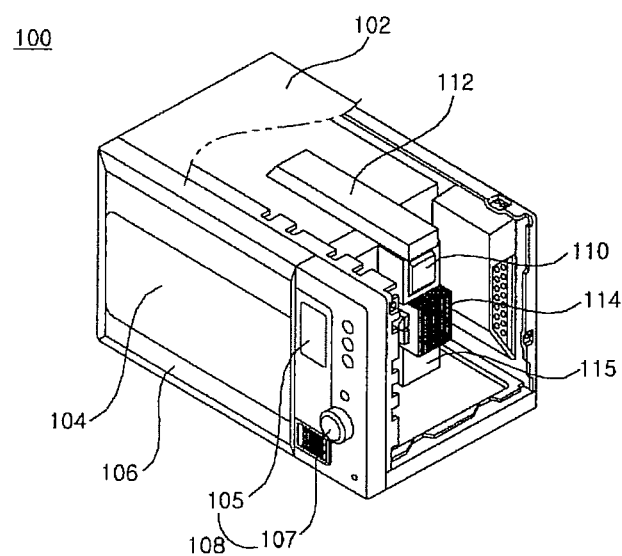
FIG. 1 is a partial perspective view illustrating a cooking appliance employing microwaves according to an embodiment of the present invention.
Figure 2:
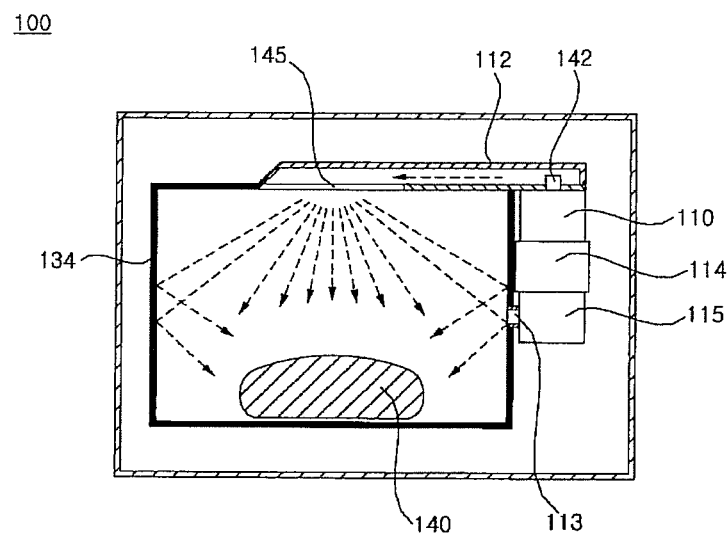
FIG. 2 is a cross-sectional view illustrating the cooking appliance shown FIG. 1.

FIG. 1 is a partial perspective view illustrating a cooking appliance employing microwaves according to an embodiment of the present invention, and FIG. 2 is a cross-sectional view illustrating the cooking appliance shown FIG. 1.

Referring to FIGS. 1 and 2, in the cooking appliance 100 employing microwaves according to the embodiment of the present invention, a door 106 on which a cooking window 104 is attached is coupled to the front portion of the main body 102 to be closed or opened and a operating panel 108 is coupled to one side portion of the front of the main body 102.

The door 106 closes and opens a cavity 134. Although not shown in drawings, the inside of the door 160 may be provided a filter (not shown) for shielding of the microwaves.

The operating panel 180 includes an operating unit 107 operating operations of the cooking appliance and a display unit 105 displaying the operations of the cooking appliance.

The inside of the main body 102 is provided with the cavity 134 having a receiving space of a predetermined size to cook a heating object 140, for example, foods by microwaves In addition, the outside surface of the cavity 134 is installed with a first microwave generating unit 110 for generating microwaves and an output side of the first microwave generating unit 110 is disposed with a microwave transmitting unit 112 for guiding microwaves generated from the first microwave generating unit 110 to the inside of the cavity 134.

The first microwave generating unit 110 may include a solid state power amplifier (SSPA) using a semiconductor. The solid state power amplifier (SSPA) has an advantage of occupying less space than a magnetron.

Meanwhile, the solid state power amplifier (SSPA) can be implemented with a hybrid microwave integrated circuits (HMIC) including an additional passive elements (capacitors or inductors) or active elements (transistors) for amplification, or a monolithic microwave integrated circuits (MMIC) on which the passive elements and the active elements are implemented as one substrate.

Meanwhile, according to the embodiment of the present invention, the first microwave generating unit 110 can generate and output a plurality of microwaves. The range of frequency of the microwave may be approximately 900 MHz to 2,500 Hz. In particular, the range of frequency of the microwave may be in a predetermined range around 915 MHz or around 2,450 MHz. The first microwave generating unit 110 is described in detail with reference to FIG. 3 below.

The first microwave transmitting unit 112 transmits microwaves generated and outputted form the first microwave generating unit 110 to the cavity 134. The first microwave transmitting unit 112 may include a waveguide or a coaxial cable. In order to transmit the generated microwaves to the first microwave transmitting unit 112, a feeder 142 is connected as shown in the drawings.

Meanwhile, the first microwave transmitting unit 112 may be implemented in the opened form having an opening 145 inside the cavity 134 as shown in the drawings, but it is not limited to thereof and an antenna can be coupled to the end. The opening 145 may be formed in various types such as a slot and the like. The microwaves are discharged to cavity 134 through the opening 145 or the antenna.

Meanwhile, in the drawings, only the opening 145 disposed on the upper side of cavity 134 is shown, but the opening 145 may be disposed on the lower or the side portion of the cavity 134 and a plurality of openings may be disposed. Further, it may be coupled through the antenna instead of the opening 145.

The second microwave generating unit 115 generates and outputs microwaves of frequency range differing from those of the first microwave generating unit 110 described above so as to heat an object in the cavity.

The second microwave generating unit 115 may be a magnetron. The magnetron 115 generates and outputs a single microwave so as to heat the object in the cavity. In this case, the microwave may be approximately 915 MHz or 2450 MHz.

The second microwave generating unit 115 used as the magnetron is described in detail with reference to FIG. 3 below.

Meanwhile, the second microwave generating unit 115 can generate and output a plurality of microwaves of frequency range differing from those of the first microwave generating unit 110 described above so as to heat the object in the cavity.

The second microwave generating unit 115 for generating and outputting a plurality of microwaves may include a solid state power amplifier (SSPA) using a semiconductor. The solid state power amplifier (SSPA) has an advantage of occupying less space than a magnetron.

In this case, the operations of the second microwave generating unit 115 are almost identical with those of the above-mentioned first microwave generating unit 110, but there is a difference that the frequency range is separated. For example, the frequency range of the first microwave generating unit 110 may be approximately 900 MHz to 1600 Hz and the frequency range of the second microwave generating unit 115 may be approximately 1600 MHz to 2500 Hz.

The second microwave generating unit 115 which generates and outputs a plurality of microwaves is described in detail with reference to FIG. 7 below.

The second microwave transmitting unit 113 transmits microwaves generated and outputted form the second microwave generating unit 115 to the cavity 134. The second microwave transmitting unit 113 may include a waveguide or a coaxial cable. In order to transmit the generated microwaves to the second microwave transmitting unit 113, a feeder (not shown) can be connected.

The lower side of the first microwave generating unit 110 is provided with a power supply 114 which supplies power to the first microwave generating unit 110.

The power supply 114 may include a high voltage transformer which supplies a high voltage to the first microwave generating unit 110 and the second microwave generating unit 115 by boosting power inputted to the cooking appliance 100, or inverter which supplies approximately 3500V or more high output voltage generated by performing switching operations of at least one switching elements to the first microwave generating unit 110 and the second microwave generating unit 115.

Meanwhile, the vicinity of the first microwave generating unit 110 may be installed with a cooling fan (not shown) which cools the first microwave generating unit 110 and the second microwave generating unit 115.

Although not shown in the drawings, the inside of the cavity 134 is installed with a turntable (not shown) which rotates the heating object 140, or the inside of the cavity 134 is provided with a stirrer fan (not shown) which distributes the microwaves and a cover (not shown) which prevents damage of the stirrer fan (not shown). The stirrer fan (not shown) can mean a kind of antenna described above.

The cooking appliance 100 employing the microwaves as described above is operated when being pressed a cooking selection button (not shown) and a start button (not shown) by operating an operation panel 108, in particular, an operating unit 107 in a state that the door 106 is closed, after the user opens the door 106 and inserts the heating object 104 in the cavity 134.

That is, the power supply 114 of the cooking appliance 100 boosts the inputted AC power to high voltage DC power and supplies the high voltage DC power to the first microwave generating unit 110 and the second microwave generating unit 115, the first microwave generating unit 110 and the second microwave generating unit 115 generates and outputs the corresponding microwaves, and the first microwave transmitting unit 112 and the second microwave transmitting unit 1130 transmits and discharges the microwaves generated from the first microwave generating unit 110 and the second microwave generating unit 115 to the cavity 134. Accordingly, the heating object 140 for example, foods provided inside the cavity 134 is cooked.

Figure 3:
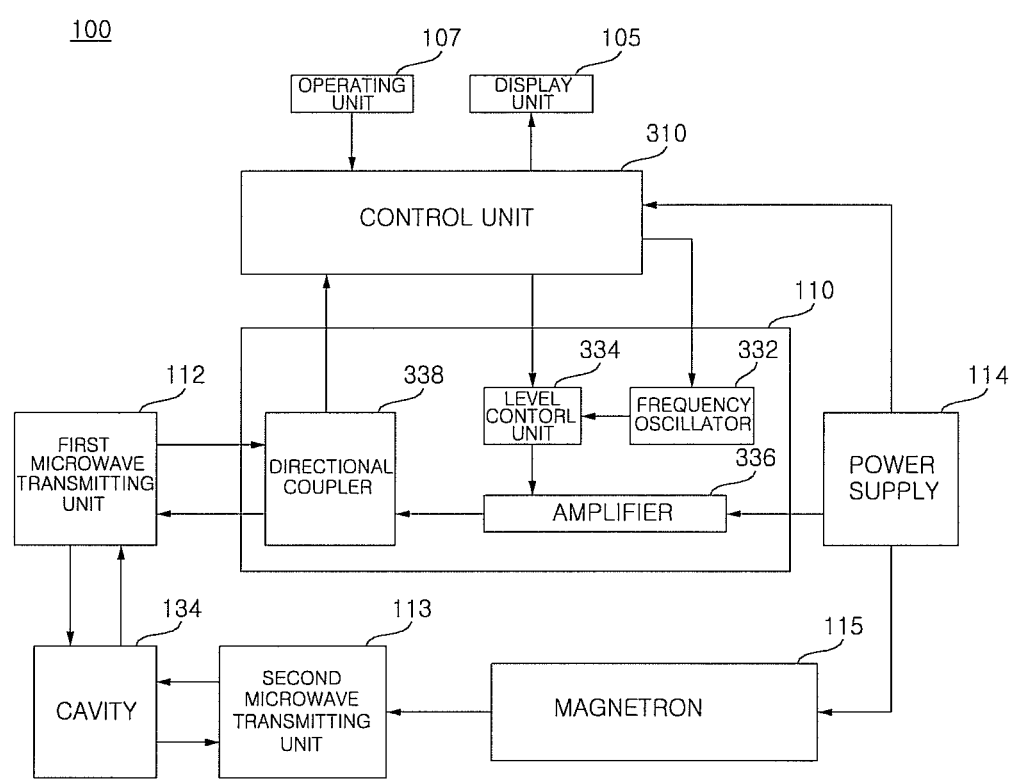
FIG. 3 is a block diagram briefly illustrating an example of the inside of the cooking appliance shown FIG. 1.

FIG. 3 is a block diagram briefly illustrating an example of the inside of the cooking appliance shown FIG. 1.

Referring to the drawings, the cooking appliance 100 according to the embodiment of the present invention includes a first microwave generating unit 110 and a second microwave generating unit 115.

The second microwave generating unit 115 may be a magnetron 115 for generating and outputting a single microwave. Hereinafter, the magnetron 115 as the second microwave generating unit 115 is mainly described.

In addition, the cooking appliance 100 may further include a control unit 310, a microwave transmitting unit 112 and the second microwave transmitting unit 113.

The first microwave generating unit 110 includes a frequency oscillator 332, a level controller 334 and an amplifier 336. In addition, the first microwave generating unit 110 may further include a directional coupler 338.

The frequency oscillator 332 operates to output microwaves of the corresponding frequencies by frequency control signal from the control unit 310. The frequency oscillator 332 may include a voltage controlled oscillator (VCO). The voltage controlled oscillator (VCO) oscillates the corresponding frequency according to voltage levels of the frequency controlled signal. For example, as the voltage level of the frequency controlled signal is increased, the frequency generated by being oscillated in the voltage controlled oscillator (VCO) is higher.

The level controller 334 oscillates to output microwaves as the corresponding power by a power control signal from the control unit 310. The level controller 334 may include a voltage controlled attenuator (VCA). The voltage controlled attenuator (VCA) performs a calibration operation to output oscillates the corresponding frequency according to voltage levels of the frequency controlled signal. For example, as the voltage level of the power controlled signal is increased, the power level to be outputted from the voltage controlled attenuator (VCA) is higher.

The amplifier 336 performs an amplifying operation to output the predetermined frequency and power through the frequency oscillator 332 and the level controller 334. The amplifier 336 may include the solid state power amplifier (SSPA) as described above, in particular, monolithic microwave integrated circuits (MMIC) using a single substrate. Accordingly, the amplifier 336 can be easily controlled by the control unit 310, and the size is smaller so that the integration of the elements may be achieved.

The directional coupler (DC) 338 transmits microwaves amplified and outputted from the amplifier 336 to the first microwave transmitting unit 112. The microwaves outputted from the first microwave transmitting unit 112 heats the object in the cavity 134. Meanwhile, the microwaves reflected, not absorbed from the object are again inputted to the directional coupler 338 through the first microwave transmitting unit 112. The directional coupler 338 transmits the reflected microwave to the control unit 310.

Meanwhile, the first microwave generating unit 110 may be disposed between the directional coupler 338 and the control unit 310 and further include DC converter (not shown) which converts the reflected microwave into a control signal. Herein, the DC converter (not shown) may be implemented as a diode element.

Meanwhile, the first microwave generating unit 110 may be disposed between the amplifier 336 and the directional coupler 338 and when the microwave amplified from the amplifier 336 is transmitted to the cavity 134, the microwave is passed and a separation unit (not shown) to block the microwave reflected from the cavity 134 may be further included. Herein, the separation unit (not shown) may be implemented with an isolator.

Meanwhile, in addition to the frequency oscillator 332, the level controller 334 and the amplifier 336 within the above mentioned the first microwave generating unit 110; the directional coupler 338 may be implemented as one module. That is, all components described above are disposed on one substrate and may be implemented as one module. Due to the integration of the elements, the first microwave generating unit 110 can be easily controlled by the control unit 310.

The magnetron 115 generates and outputs a single microwave. The outputted microwaves output to the cavity 134 through the second microwave transmitting unit 113.

Meanwhile, according to the embodiment of the present invention, the first microwave generating unit 110 which generates a plurality of microwaves and the magnetron 115 are used together.

The first microwave generating unit 110 which generates a plurality of microwaves calculates the heating efficiency as described below, and the heating time is varied according to the efficiency so as to uniformly heat the object. However, the first microwave generating unit 110 has a disadvantage that the efficiency is lower than the magnetron 115 in terms of power consumption. Meanwhile, the magnetron 115 is tended to non-uniformly heat the object.

In the embodiment of the present invention, the first microwave generating unit 110 is mainly operated in the defrosting process that a uniform heating is a priority for the cooking processes and the magnetron 115 is mainly operated in the heating process that a heating efficiency is a priority than the uniform heating for the cooking processes.

The control unit 310 controls overall operations of the cooking appliance. When the operating signal of the cooking appliance is inputted through the operating unit 107, the control unit 310 controls the first microwave generating unit 110 and the magnetron 115 to output the microwaves. For example, the control unit 310 variably controls operations of the first microwave generating unit 110 and the magnetron 115 according to the cooking process of the object, as described above.

Hereinafter, the first microwave generating unit 115 to be controlled by the control unit 310 is mainly described.

The control unit 310 controls such that frequency controlled signal is outputted and the corresponding frequencies are oscillated in the frequency oscillator 332.

Meanwhile, the control unit 310 can output the frequency controlled signal of the different voltage levels in order to output the microwaves having a plurality of frequencies. Accordingly, the frequency oscillator 332 oscillates the corresponding frequency according to the voltage level of the inputted frequency control signal. Meanwhile, the plurality of frequency controlled signal may be sequentially outputted from the control unit 310.

The control unit 310 controls such that a power controlled signal is outputted so that the corresponding power level in the level controller 334 may be outputted.

Meanwhile, the control unit 310 can output the power controlled signal of the different voltage levels in order to output the microwaves having a plurality of powers. Accordingly, the level controller 334 outputs the corresponding power level according to the voltage level of the inputted power control signal. Meanwhile, the plurality of power controlled signals may be sequentially outputted from the control unit 310.

In addition, the control unit 310 controls such that the outputted microwave power is compared with a reference power, and then the microwave power is constant on the basis of the difference. For example, when the first microwave generating unit 110 generates and outputs the plurality of microwaves, the control unit 310 can control such that a plurality of microwave powers are compared with the reference power, and then all the outputted microwave powers are constant on the basis of the difference. The operations are described with reference to FIG. 4 below.

Meanwhile, the control unit 310 may calculate the heat efficiency based on the microwaves reflected, not absorbed to the object of microwaves discharged to the cavity 134.

$$he = (Pt - Pr)/Pt \quad \text{[Equation 1]}$$

Herein, Pt represents a power of the microwave discharged to the inside of the cavity 134, Pr indicates a power of the microwave discharged from the cavity 134 and he represents a heat efficiency of the microwave.

According to the above mentioned Equation 1, the heating efficiency he is smaller, as the power of the reflected microwave is greater.

Meanwhile, when a plurality of microwaves is discharged into the cavity 134, the control unit 310 calculates the heat efficiency he for each frequency of the plurality of microwaves. The heating efficiency calculation can be performed during the entire cooking section.

In particular, according to the embodiment of the present invention, the heating efficiency calculation can be preferably performed in the defrosting process of the entire cooking process.

In the embodiment of the present invention, the heating efficiency he can be directly calculated while directly heating the object, and the output period of the microwave may be varied according to the heating efficiency he, without requiring an additional scanning section for calculating only the heating efficiency.

The control unit 310 generates and outputs the frequency control signal to vary the output period of the microwave according to the calculated heating efficiency. Accordingly, the frequency oscillator 332 oscillates the corresponding frequency according to the inputted frequency control signal.

The control unit 310 generates the frequency control signal such that when the calculated heating efficiency he is higher, the output period of microwave is shorter. That is, during the plurality of microwaves is sequentially swept, the output period of each of the microwaves can be varied according to the calculated heating efficiency. That is, as the heating efficiency he is higher, the corresponding output period is preferably shorter. Accordingly, the microwaves can be uniformly absorbed in the heating object 140 inside the cavity 134 for each frequency to uniformly heat the heating object 140. The detail operations of the control unit 310 are described with reference to FIG. 4 below.

Meanwhile, the control unit 310 can control such that microwaves of the corresponding frequency may be outputted only when the heating efficiency he calculated for each frequency is equal to or greater than a predetermined value. That is, the heating object 140 can be uniformly heated by excluding microwaves of the frequencies that the heating efficiency he is significantly lower from actual heating section.

Meanwhile, the cooking appliance 100 can eliminate the need for an additional storage unit since the output period of the microwave is varied in real time according to the heating efficiency and an additional microprocessor and the like is also omitted.

Meanwhile, in addition to the frequency oscillator 332, the level controller 334 and the amplifier 336 within the above mentioned the first microwave generating unit 110; the directional coupler 338 may be implemented as one module. That is, all components described above are disposed on one substrate and may be implemented as one module.

The power supply 114 outputs a high voltage to the first microwave generating unit 110 or the magnetron 115 by boosting power inputted to the cooking appliance 100. The power supply 114 may be implemented as a high voltage transformer or an inverter.

Figure 4:
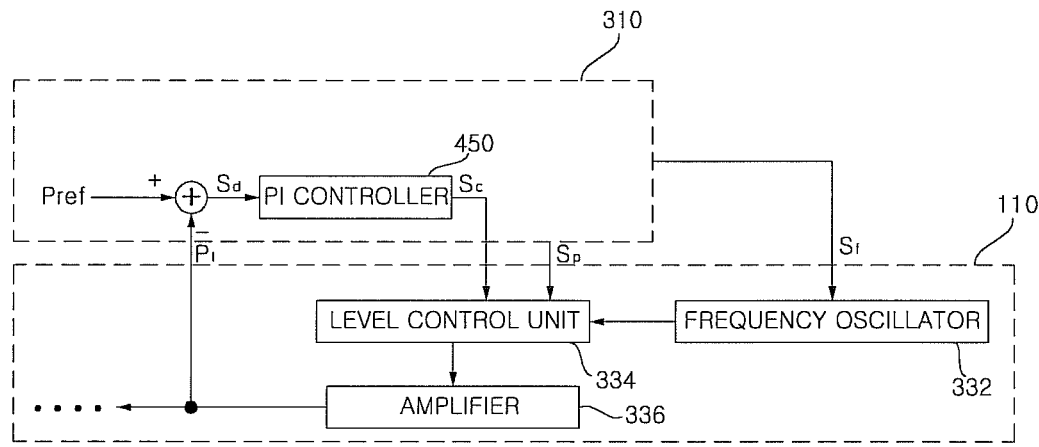
FIG. 4 is a view illustrating the inside of a control unit shown FIG. 3.

FIG. 4 is a view illustrating the inside of a control unit shown FIG. 3.

Referring to the drawings, the control unit 310 includes a proportional integral controller (PI controller) for constantly controlling power of microwaves outputted from the first microwave generating unit 110.

The first microwave generating unit 110 receives the frequency control signal Sf and the level control signal Sp from the control unit 310 to oscillate the corresponding frequency according to the frequency control signal Sf in the frequency oscillator 332 and receives the level control signal Sp to output the corresponding level in the level control unit 334 such that microwaves of a level of a predetermined power and a frequency oscillated in the amplifier 336 can be outputted, as described above.

Normally, the outputted microwave power Pt is not outputted as a set power since it is controlled by an open loop control without a feedback.

Accordingly, when the microwaves which exceed the set power level are outputted to the cavity 134, the power of the reflected microwave is able to exceed a permissible range. Accordingly, the possibility of a break of the circuit element, for example DC conversion unit (diode element, etc.) is increased. In addition, the accuracy of the calculated heating efficiency is lower.

In the embodiment of the present invention, the power Pt of the outputted microwave is controlled to be uniform.

Meanwhile, the control unit 310 can include a storage unit (not shown) for storing a reference power Pref.

Accordingly, the control unit 310 compares the power Pt of the outputted microwave with the reference power Pref and calculate the difference Sd to perform the proportional integral control based on the calculated difference signal Sd.

Herein, the proportional integral controller 450 controls such that the error of the difference signal Sd is zero. The proportional integral signal Sc on the proportional integral control is performed is outputted to the level control unit 334.

The level control unit 334 receives the proportional integral signal Sc and the level control signal Sp to output a signal of a constant level. As a result, the amplifier 336 outputs the microwave of the constant power.

Thus, the power Pt of the outputted microwave is performed by a close loop control for feedback and then the first microwave generating unit 110 outputs the microwave of constant power.

The close loop control can be also applied when a plurality of microwaves of the different frequencies are outputted in the first microwave generating unit 110. Accordingly, the first microwave generating unit 110 outputs the plurality of microwaves of the different frequencies having all the same power.

Figure 5:
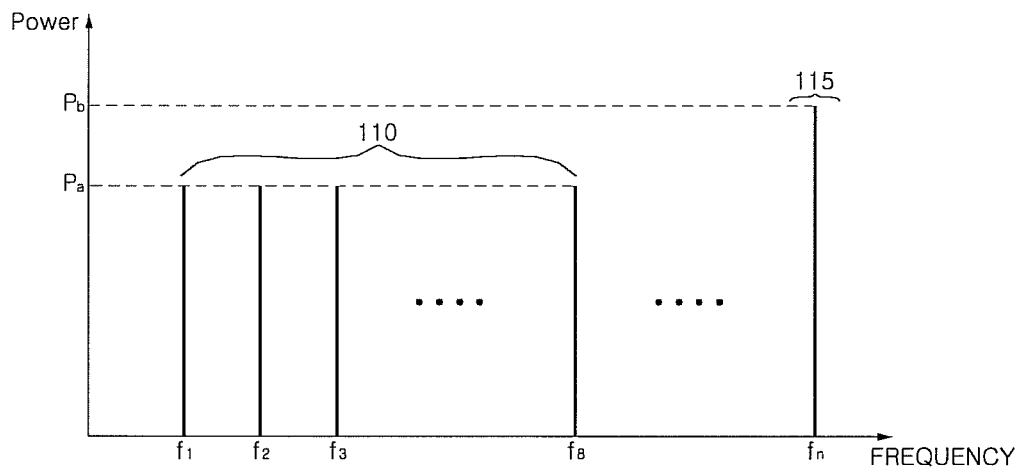
FIG. 5 is a view illustrating power according to frequency of microwave outputted from the cooking appliance of FIG. 3.

FIG. 5 is a view illustrating power according to frequencies of microwaves outputted from the cooking appliance of FIG. 3.

Referring to the drawings, the control unit 310 controls such that power of a plurality of microwaves (the corresponding frequency is f1, . . . f8) outputted from the first microwave generating unit 110 is constant (Pa), as described above. In particular, the plurality of microwaves outputted from the microwave generating unit 110 may be within a predetermined range around 915 MHz, as described above.

Meanwhile, the magnetron 115 outputs a single microwave. In this case, the frequency may be approximately 2450 MHz as described above. It knows that the power Pb of microwave outputted from the magnetron 115 is the power Pa of the plurality of microwaves outputted from the microwave generating unit 110. Accordingly, in the heating (boiling) process of the cooking process, the magnetron 115 having higher power is preferably used.

Figure 6:
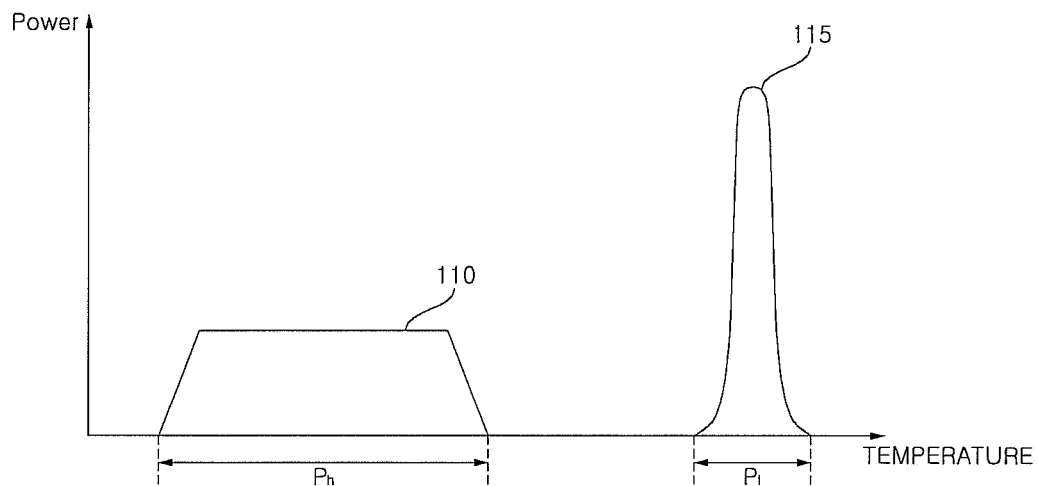
FIG. 6 is a view illustrating power according to a temperature of the microwave outputted from the cooking appliance of FIG. 3.

FIG. 6 is a view illustrating power according to a temperature of the microwave outputted from the cooking appliance of FIG. 3.

Referring to the drawings, as described above, the plurality of microwaves outputted from the first microwave generating unit 110 are preferably used in the defrosting process Ph of entire cooling processes. In this way, the heating may be uniformly performed. In addition, as described above, the heating efficiency is calculated during the defrosting process and the output time of the microwave may be varied according to the calculated heating efficiency.

The single microwave outputted from the magnetron 115 is preferably used in the heating process Pf of entire cooking processes. Thereby, the object can be effectively heated.

Figure 7:
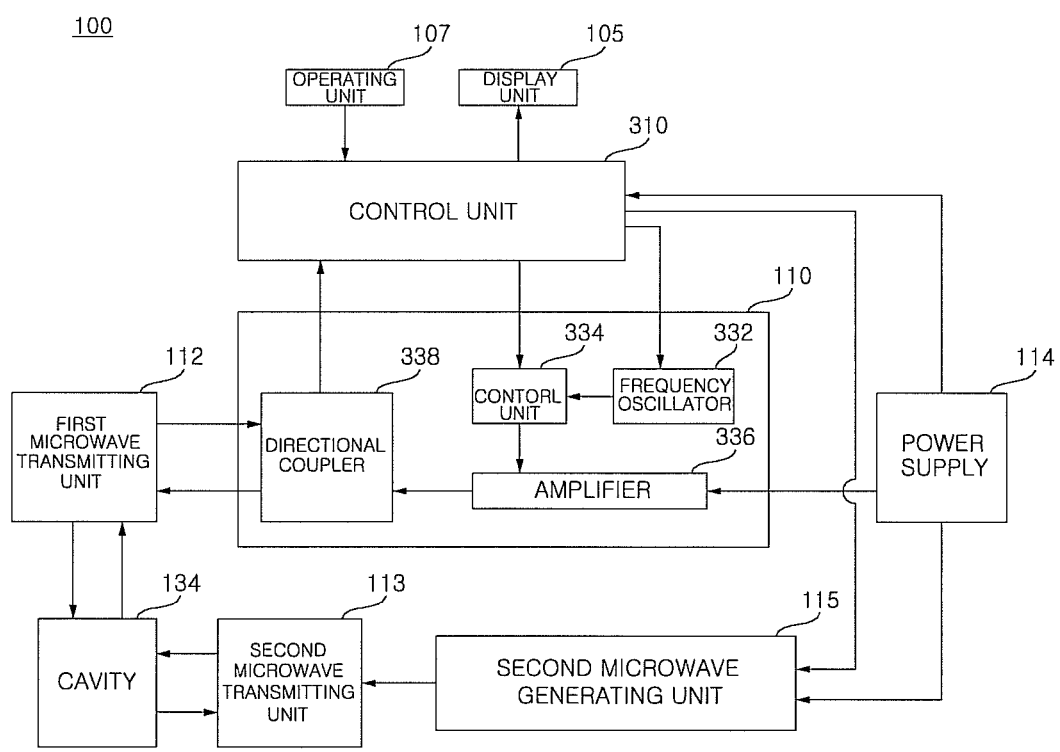
FIG. 7 is a block diagram briefly illustrating another example of the inside of the cooking appliance shown FIG. 1.

FIG. 7 is a block diagram briefly illustrating another example of the inside of the cooking appliance shown FIG. 1.

Referring to the drawings, the cooking appliance 100 according to the embodiment of the present invention includes a first microwave generating unit 110 and a second microwave generating unit 115.

In addition, the cooking appliance 100 may further include a control unit 310, a microwave transmitting unit 112 and the second microwave transmitting unit 113.

The first microwave generating unit 110 includes a frequency oscillator 332, a level controller 334 and an amplifier 336. In addition, the first microwave generating unit 110 may further include a directional coupler 338.

Compared with FIG. 3, there is a difference that the plurality of microwaves are outputted, instead of the magnetron that the second microwave generating unit 115 outputs the single microwave. Hereinafter, the difference is mainly described. The second microwave generating unit 115 may include a solid state power amplifier (SSPA) using a semiconductor, like the first microwave generating unit 110. The solid state power amplifier (SSPA) has an advantage of occupying less space than a magnetron.

Meanwhile, although not shown in the drawings, the second microwave generating unit 115 may include a frequency oscillator (not shown), a level controller (not shown) and an amplifier (not shown), like the first microwave generating unit 110. In addition, the second microwave generating unit 115 may further include a directional coupler (not shown).

Meanwhile, according to the embodiment of the present invention, the first microwave generating unit 110 which generates a plurality of microwaves and the second microwave generating unit 115 are used together. For example, the frequency range of the first microwave generating unit 110 may be approximately 900 MHz to 1600 Hz and the frequency range of the second microwave generating unit 115 may be approximately 1600 MHz to 2500 Hz.

The first microwave generating unit 110 and the second microwave generating unit 115 which generate a plurality of microwaves calculate the heating efficiency as Equation 1 described above, and the heating time is varied according to the efficiency so as to uniformly heat the object.

Meanwhile, when generating a plurality of microwaves, there is a disadvantage that as a broadband frequency range is used, the efficiency is lower in terms of power consumption.

Accordingly, in the embodiment of the present invention, the microwave generating units and the corresponding microwave transmitting units are used by considering the power consumption. Although the two microwave generating units and the corresponding two microwave are shown in the drawings, but the present invention is not limited to thereof and various numbers of microwave generating units and the transmitting units can be used.

The control unit 310 controls overall operations of the cooking appliance. When the operating signal of the cooking appliance is inputted through the operating unit 107, the control unit 310 controls the first microwave generating unit 110 and the second microwave generating unit 115 to output the microwaves of broadband frequency range, sequentially.

For example, the control unit 310 can control such that the first microwave generating unit 110 sequentially outputs microwaves of the lower frequency band and the second microwave generating unit 115 sequentially outputs microwaves of the higher frequency band.

Meanwhile, the internal block diagram of the control unit can be also applied to a control unit of the FIG. 7.

That is, the control unit 310 may include a proportional integral controller (PI controller) (450) for constantly controlling power of microwaves outputted from the first and second microwave generating units 110 and 115.

Accordingly, the control unit 310 compares the power Pt of the outputted microwave with the reference power Pref and calculate the difference Sd to perform the proportional integral control based on the calculated difference signal Sd.

Herein, the proportional integral controller 450 controls such that the error of the difference signal Sd is zero. The proportional integral signal Sc on the proportional integral control is performed is outputted to the level control unit 334.

The level control unit 334 receives the proportional integral signal Sc and the level control signal Sp to output a signal of a constant level. As a result, the amplifier 336 outputs the microwave of the constant power.

Thus, the power Pt of the outputted microwave is performed by a close loop control for a feedback and then the first and second microwave generating units 110 and 115 output the microwave of constant power.

Figure 8:
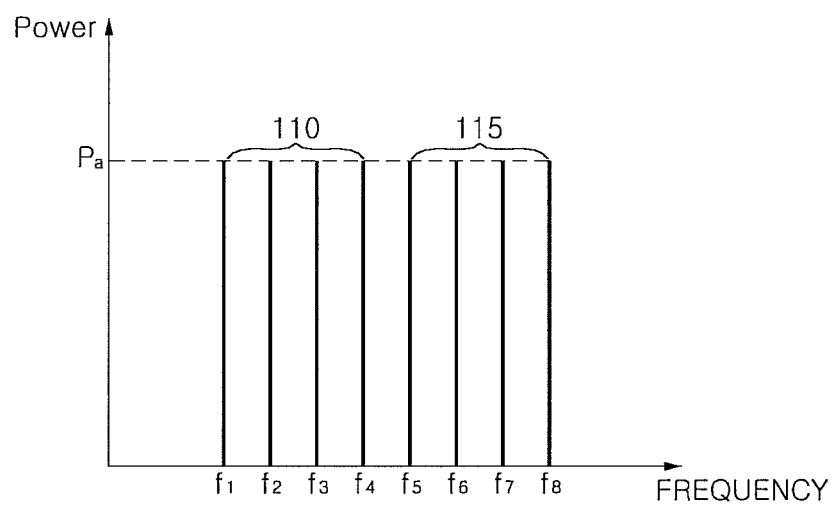
FIG. 8 is a view illustrating the microwave outputted from the cooking appliance of FIG. 7.

FIG. 8 is a view illustrating the microwave outputted from the cooking appliance of FIG. 7.

Referring to the drawings, the control unit 310 controls such that microwaves (the corresponding frequency is f1, ... f4) of the lower band frequencies of a plurality of microwaves (the corresponding frequency is f1, ... f8) are outputted from the first microwave generating unit 110 and microwaves (the corresponding frequency is f5, ... f8) of the upper band frequencies are outputted from the second microwave generating unit 115. As described above, the upper band frequency band may be approximately 900 MHz to 1600 Hz and the lower band frequency band may be approximately 1600 MHz to 2500 Hz.

Meanwhile, the control unit 310 controls such that power Pa of microwaves outputted from the first and second microwave generating units 110 and 115 is constant, as described in FIG. 4. Accordingly, the uniform heating can be performed in the scanning section or the cooking section of the cooking process.

Figure 9:
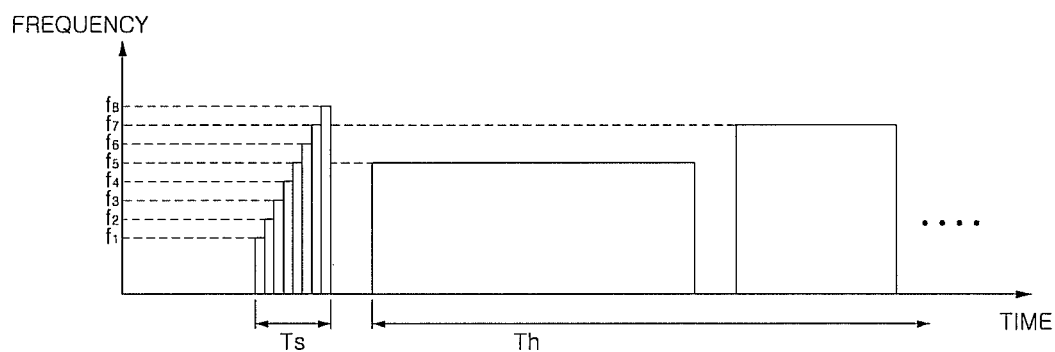
FIG. 9 is a view illustrating a scanning section and a cooking section of the cooking appliance of FIG. 7.

FIG. 9 is a view illustrating a scanning section and a cooking section of the cooking appliance of FIG. 7.

Referring to the drawings, the cooking appliance 1 according to the embodiment of the present invention can output a plurality of microwaves of the different frequencies from a first and second microwave generating units 110 and 115.

Meanwhile, the cooking section can be divided into a scanning section Ts for calculating a heating efficiency for the each of microwaves of the different frequencies f1, f2, f3, ... f8 and a heating section Tf for heating a heating object in the cavity according to the heating efficiency calculated from the scanning section Ts.

According to the calculated heating efficiency, the output time or output power of each microwave of the different frequencies f1, f2, f3, ... f8 is can be varied, during the heating section Th. The drawing is showing that the output period is constant, and this means that the output power is varied. Thereby, the object in the cavity can be effectively heated.

Those skilled in the art will understand that the present invention can be implemented as other concrete forms without changing the inventive concept or essential features. Therefore, these embodiments as described above are only proposed for illustrative purposes and do not limit the present invention. It will be apparent to those skilled in the art that a variety of modifications and variations may be made without departing the spirit and scope of the present invention as defined by the appended claims. Further, such modifications and variations should not be understood independently from the technical idea or perspective of the present invention.

The invention claimed is:

1. A cooking appliance employing microwaves, comprising:
a first microwave generating device to sequentially generate and output a plurality of microwaves having a plurality of frequencies;
a first waveguide to transmit the plurality of microwaves from the first microwave generating device to a cavity;
a magnetron to generate and output a single microwave different from each of the plurality of microwaves generated in the first microwave generating device;
a second waveguide to transmit the single microwave from the magnetron to the cavity; and
a controller to control the first microwave generating device and the magnetron, wherein the controller calculates a heating efficiency based on the plurality of microwaves to be output from the first microwave generating device to the cavity and microwaves reflected in the cavity, and wherein the controller controls the first microwave generating device to output a portion of the plurality of microwaves in a heating section based on the calculated heating efficiency, wherein the first microwave generating device includes:
a frequency oscillator including a voltage controlled oscillator, wherein the voltage controlled oscillator oscillates a corresponding frequency according to a voltage level of a frequency control signal input from the controller;
a level controller including a voltage controlled attenuator, wherein the voltage controlled attenuator performs a calibration operation to output the corresponding frequency according to the voltage level of the frequency control signal; and
an amplifier including a solid state power amplifier, wherein the amplifier amplifies the oscillated frequency signal through the frequency oscillator and the level controller and outputs the plurality of microwaves for heating an object in the cavity.

2. The cooking appliance of claim 1, wherein the controller controls the first microwave generating device such that the first microwave generating device outputs more microwaves than the magnetron, when defrosting an object in the cavity.

3. The cooking appliance of claim 1, wherein the controller controls the magnetron such that the magnetron outputs more microwaves than the first microwave generating device, when heating the object in the cavity.

4. The cooking appliance of claim 1, wherein the controller generates the frequency control signal to vary an output period of the microwave from the first microwave generating device, based on the heating efficiency calculated by the microwaves output from the first microwave generating device to the cavity and microwaves reflected in the cavity.

5. The cooking appliance of claim 4, wherein the controller generates the frequency control signal such that an output period of the microwave decreases as the calculated heating efficiency increases.

6. A cooking appliance employing microwaves, comprising:
a first microwave generating device to sequentially generate and output a plurality of microwaves having a plurality of frequencies;
a first waveguide to transmit the plurality of microwaves from the first microwave generating device to a cavity;
a second microwave generating device to sequentially generate and output a plurality of microwaves having a plurality of frequencies different from the plurality of microwaves of the first microwave generating device
a second waveguide to transmit the plurality of microwaves from the second microwave generating device to the cavity; and
a controller to control the first microwave generating device and the second microwave, generating device to output different frequencies, wherein the controller calculates a heating efficiency based on the plurality of microwaves to he output from the first microwave generating device and the second microwave generating device to the cavity and microwaves reflected in the cavity, and wherein the controller controls the first microwave generating device and the second microwave generating device to output a portion of the plurality of microwaves in a heating section based on the calculated heating efficiency, wherein the first microwave generating device includes:
a frequency oscillator including a voltage controlled oscillator, wherein the voltage controlled oscillator oscillates a corresponding frequency according to a voltage level of a frequency control signal input from the controller;
a level controller including a voltage controlled attenuator, wherein the voltage controlled attenuator performs a calibration operation to output the corresponding frequency according to the voltage level of the frequency control signal; and
an amplifier including a solid state power amplifier, wherein the amplifier amplifies the oscillated frequency signal through the frequency oscillator and the level controller and outputs the plurality of microwaves for heating an object in the cavity.

7. The cooking appliance of claim 6, wherein the controller generates the frequency control signal to vary output periods or output power of the plurality of microwaves generated from the first and second microwave generating devices based on the heating efficiency calculated based on the microwaves output from the first and second microwave generating devices to the cavity and microwaves reflected in the cavity.

8. The cooking appliance of claim 7, wherein the controller generates the frequency control signal such that the output period of the microwave decreases as the calculated heating efficiency increases.

9. The cooking appliance of claim 1, wherein the controller controls the first microwave generating device to output the plurality of microwaves in a scanning section, and wherein the controller controls the first waveguide to output the portion of the plurality of microwaves in the heating section based on the calculated heating efficiency.

10. The cooking appliance of claim 6, wherein the controller controls the first and second microwave generating devices to output the plurality of microwaves in a scanning section, and wherein the controller controls the first and second microwave generating devices to output the portion of the plurality of microwaves in the heating section based on the calculated heating efficiency.

* * * * *